UNITED STATES PATENT OFFICE.

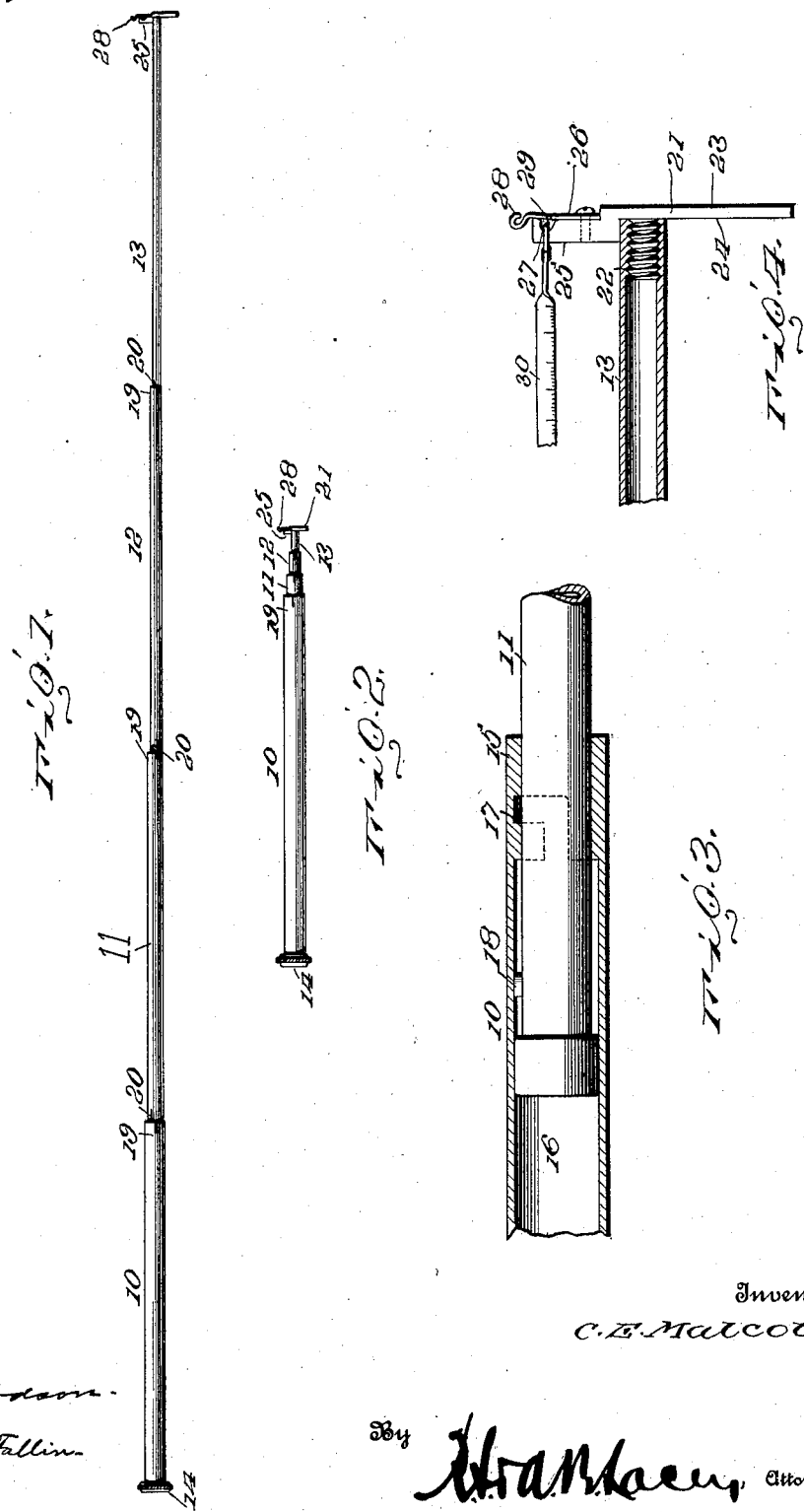

CARL E. MALCOLM, OF ST. PAUL, MINNESOTA.

MEASURING-POLE.

1,003,626.  Specification of Letters Patent.  Patented Sept. 19, 1911.

Application filed October 7, 1910. Serial No. 585,881.

*To all whom it may concern:*

Be it known that I, CARL E. MALCOLM, a citizen of the United States, residing at St. Paul, in the county of Ramsey and State of Minnesota, have invented certain new and useful Improvements in Measuring-Poles, of which the following is a specification.

This invention relates to measuring instruments of the class of extension instruments, and has for one of its objects to improve the construction and increase the efficiency and utility of devices of this character.

Another object of the invention is to provide a simply constructed instrument which may be extended or collapsed as required.

Another object of the invention is to provide a device of this character which may be employed for measuring distances between objects either horizontally or perpendicularly or otherwise without any structural change in the instrument.

Another object of the invention is to provide a device of this character which may be employed in connection with an ordinary measuring tape to hold the ring end of the latter and thus provide means whereby one person can use a relatively long portion of a measuring tape.

With these and other objects in view that will more fully appear as the description proceeds, the invention consists in certain constructions and arrangements of the parts that I shall hereinafter more fully describe and then point out the novel features in the appended claims.

For a full understanding of the invention and the merits thereof, reference is to be had to the following description and accompanying drawings, in which:

Figure 1 is a side elevation of the instrument in its open or distended position; Fig. 2 is a view of the instrument in its collapsed or folded position; Fig. 3 is an enlarged sectional detail of the improved instrument illustrating its construction; Fig. 4 is a view similar to Fig. 1 illustrating the manner of employing the improved instrument in connection with a measuring tape.

Corresponding and like parts are referred to in following description and indicated in all the views of the drawings by the same reference characters.

The improved instrument comprises in general a plurality of telescoping sections having means for locking the sections in open or distended position and with a lateral foot at the outer end of one of the terminal sections, the foot having means for the attachment of a measuring tape to enable the latter to be held in position while being used, as hereafter explained. Any required number of the sections may be employed, but for the purpose of illustration an instrument embracing four of the sections is shown to provide an instrument capable of being extended to sixteen feet, and which will occupy a space of a few inches over four feet when collapsed, but it will be understood that any required number of the sections may be employed and of any required length, the lengths of the sections depending upon the distances in connection with which the instrument is to be employed. The four sections employed to illustrate the construction and operation of the improved instrument are designated by the characters 10, 11, 12 and 13, the section 10 being the largest and the section 13 being the smallest. The section 10 is provided at one end with a closing cap 14 and thus form a finial, at one end of the implement. At its opposite end the section 10 is reduced internally for a distance as represented at 15, the reduced portion forming a bearing for the body of the section 11, while the section 11 at one end is provided with a slight enlargement 16 which fits slidably within the body of the section 10. By this means the two sections 10—11 are slidably engaged and operate without any undue lateral movement. The reduced portion 15 of the section 10 is provided with an L-shaped recess 17 while the section 11 is provided with a projection 18 which engages in the recess and forms an effectual lock between the parts 10—11 when the part 11 is drawn outwardly to its fullest extent which movement causes the projection 18 to pass into the longitudinal portion of the recess 17, and then by rotating the section 11, the projection passes into the circumferential portion of the recess, the recess 17 and the projection 18 thus forming a bayonet joint between the parts 10—11, which effectually supports them in distended position. The sections 11, 12 and 13 are provided with like reduced portions 15 with the L-shaped recesses 17, the guiding enlargements 16 and the projections 18, so that all of the sections may be locked in open position when required. All of the sections are provided with guiding lines 19—20 so located that they coincide or appear in longitudinal alinement when the projections 18 are opposite the longitudinal portions of the recesses 17, to enable the operator to properly locate the sections to enable him to expeditiously perform the locking action. At its outer end, the smallest section 13 is provided with a lateral foot member 21, preferably provided with a threaded plug 22 engaging internal threads in the section. The outer face 23 of the foot 21 is at right angles to the longitudinal axis of the sections, while the inner face 24 of the foot at one side of the section 13 extends in parallel relations to the face 23. The foot 21 is also provided with an offset 25, preferably at the side opposite to the bearing portion defined by the faces 23—24, with the outer face 26 of the offset in alinement transversely with the bearing face 24. The offset 25 is provided with a recess 27 opening through the face 26 and covered by a resilient guard 28. The recess 27 provides means for supporting the ring portion 29 of a measuring tape 30, the object to be hereafter explained.

An instrument of this character is designed more particularly to enable one person to employ a relatively long portion of a measuring tape to measure distances which have heretofore required two persons and a ladder. For instance, the distance between the eaves of a building and the ground, or the distance across a relatively large room, and in employing the instrument for measuring the distance from the eaves to the ground the ring portion 29 of a tape line 30 is inserted into the aperture 27 of the projection 25, and the members 10, 11, 12 and 13 are distended, as shown in Fig. 1, and locked in open position, as before described. The operator then grasps the larger section 10 in one hand and employs the implement to hold the projection 21 over one terminal of the structure to be measured and holds the tape line with the other hand at the level of the ground, and thus notes the total distance. If the distance to be measured is the side of a building, as for instance the distance between a cornice and the ground, the projection 21 is placed over the cornice, and the implement thus held vertically. If the distance to be measured is the width or length of a room the ring 29 of the tape is placed over the projection 21 so that the outer side of the ring can be held against one wall and the implement held horizontally and employed in the same manner. If the total distance to be measured is less than the combined lengths of the tubular members, two or more of the tubular members may be distended, and the implement employed in the same manner.

The telescoping sections may be of any suitable material, galvanized iron, or steel, brass, or other suitable metal or metallic compound, may be of any suitable size, and as light as possible consistent with the strains to which the instrument will be subjected when in use. In practice the largest section 10 is one inch in diameter, the next section 11, $\frac{25}{32}$ of an inch in diameter, and the next section 12 is $\frac{11}{16}$ of an inch in diameter, while the smallest section 13 is $\frac{15}{32}$ of an inch in diameter. The largest section 10 is four feet in length, while the remaining sections are about four feet and six inches in length, the six inches representing the telescoping portions of the sections when distended, so that each section shows just four feet in length when distended, making a total of sixteen feet. While these dimensions have been found convenient in practice, it will be understood that it is not desired to limit the device to any specific sizes, material, or dimensions of the parts. The sizes given provide an efficient easy working instrument, and combines lightness with strength.

Having thus described the invention, what is claimed as new is:

1. A measuring instrument comprising a plurality of telescoping sections, locking means operating to hold the sections in distended position, and a lateral foot connected to one terminal section and carrying a measuring tape holding device.

2. A measuring instrument comprising a plurality of telescoping sections, locking means operating to hold the sections in distended position, and a lateral foot upon one terminal section, said foot having a bearing portion and a tape holding portion, the inner face of the bearing portion being in alinement transversely with the outer face of the tape holding portion.

3. A measuring instrument comprising a plurality of telescoping sections, locking means operating to hold the sections in distended position, and a lateral foot upon one terminal section and carrying a tape holder, said foot having an offset with the outer face of the offset in alinement transversely with the inner face of the body of the foot, said offset being further provided with a recess to support a measuring tape.

In testimony whereof, I affix my signature in presence of two witnesses.

CARL E. MALCOLM. [L. S.]

Witnesses:
 PAULINE H. MURPHY,
 F. L. BREEN.

---

Copies of this patent may be obtained for five cents each, by addressing the "Commissioner of Patents Washington, D. C."